(12) United States Patent
Ding et al.

(10) Patent No.: US 6,716,270 B2
(45) Date of Patent: Apr. 6, 2004

(54) POLYIMIDE AMIC ACID SALTS AND POLYIMIDE MEMBRANES FORMED THEREFROM

(75) Inventors: Yong Ding, Norwood, MA (US); Benjamin Bikson, Brookline, MA (US); Joyce Katz Nelson, Lexington, MA (US); James Timothy Macheras, Quincy, MA (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/350,230

(22) Filed: Jan. 23, 2003

(65) Prior Publication Data

US 2003/0164090 A1 Sep. 4, 2003

Related U.S. Application Data

(63) Continuation of application No. 09/661,901, filed on Sep. 14, 2000, now abandoned, which is a continuation-in-part of application No. 09/404,724, filed on Sep. 24, 1999, now Pat. No. 6,497,747.

(51) Int. Cl.[7] .......................... B01D 53/22; B01D 69/08; B01D 69/12; B01D 71/64
(52) U.S. Cl. ...................... 95/45; 95/47; 95/51; 95/53; 95/54; 96/10; 96/13; 96/14; 210/500.39
(58) Field of Search ................ 95/45, 47, 51, 95/53, 54; 96/4, 8, 10, 13, 14; 210/500.39

(56) References Cited

U.S. PATENT DOCUMENTS

| | | | | |
|---|---|---|---|---|
| 4,528,004 A | * | 7/1985 | Makino et al. ............... 96/13 |
| 4,717,393 A | * | 1/1988 | Hayes ........................ 95/51 |
| 4,717,394 A | * | 1/1988 | Hayes ........................ 95/49 |
| 4,952,220 A | * | 8/1990 | Langsam et al. ............ 96/13 |
| 4,988,371 A | * | 1/1991 | Jeanes et al. ................ 95/53 |
| 5,009,679 A | * | 4/1991 | Angus et al. ................ 95/54 |
| 5,248,319 A | * | 9/1993 | Ekiner et al. ................ 95/54 |
| 5,320,650 A | * | 6/1994 | Simmons ..................... 96/14 |
| 5,334,697 A | * | 8/1994 | Simmons ................... 528/353 |
| 5,348,569 A |   | 9/1994 | Bikson et al. ............... 95/45 |
| 5,618,334 A | * | 4/1997 | Ozcayir et al. ............. 96/14 |
| 5,674,629 A | * | 10/1997 | Avrillon ................. 428/473.5 |
| 5,716,430 A | * | 2/1998 | Simmons ..................... 96/13 |
| 5,749,943 A | * | 5/1998 | Shimazu et al. ............ 95/50 |
| 5,817,165 A |   | 10/1998 | Hachisuka et al. ......... 96/14 X |
| 5,882,382 A |   | 3/1999 | Hachisuka et al. ......... 96/14 X |
| 5,922,203 A |   | 7/1999 | Tomaschke ........ 210/500.39 X |
| 5,969,087 A | * | 10/1999 | Maeda ..................... 528/353 |
| 6,296,684 B1 |   | 10/2001 | Ekiner ....................... 96/14 X |
| 6,497,747 B1 | * | 12/2002 | Ding et al. .................. 95/45 |

FOREIGN PATENT DOCUMENTS

| | | | |
|---|---|---|---|
| EP | 0747418 A1 | 12/1996 | |
| EP | 0750939 A2 | 1/1997 | |
| EP | 0811421 A1 | 12/1997 | |
| GB | 2098994 A | * 12/1982 | ................ 96/14 |

OTHER PUBLICATIONS

Polotskaya et al., "The Effect of Imidization on Gas–Separation Properties of Membranes Based on Poly(4,4'-oxydiphenylene) pyromellitimide", Polymer Science, Ser. B. vol. 38, Nos. 7–8 (1996) pp281–284□□.*

Polotskaya et al. "Gas Transport Properties and Structural Order of Poly(4,4'-oxydiphenylene) pyromellitimide in Composite Membranes", Separation and Purification Technology 14 (1998) pp 13–18.*

* cited by examiner

Primary Examiner—Robert H. Spitzer
(74) Attorney, Agent, or Firm—David M. Rosenblum (57) ABSTRACT

The invention relates to preparation and uses of novel polymeric materials, polyimide amic acid salts (PIAAS). The use of these materials for the fabrication of fluid separation membranes is further disclosed.

24 Claims, 4 Drawing Sheets

FIG. 1

Preparation of polyimide amic acid salts

POLYIMIDE AMIC ACID SALTS AND POLYIMIDE MEMBRANES FORMED THEREFROM

This is a Continuation of prior U.S. application Ser. No. 09/661,901 Filing Date: Sep. 14, 2000, now abandoned and which in turn is a CIP of U.S. application Ser. No. 09/404,724 Filing Date Sep. 24, 1999, now U.S. Pat. No. 6,497,747.

This invention was made with government support under Contract No. DE-FC26-99FT40497 awarded by the U.S. Department of Energy. The government has certain rights in the invention.

FIELD OF INVENTION

The invention relates to preparation and uses of novel polymeric materials, polyimide amic acid salts (PIAAS). The use of these materials for the fabrication of fluid separation membranes is further disclosed.

BACKGROUND OF THE INVENTION

Figure 1:
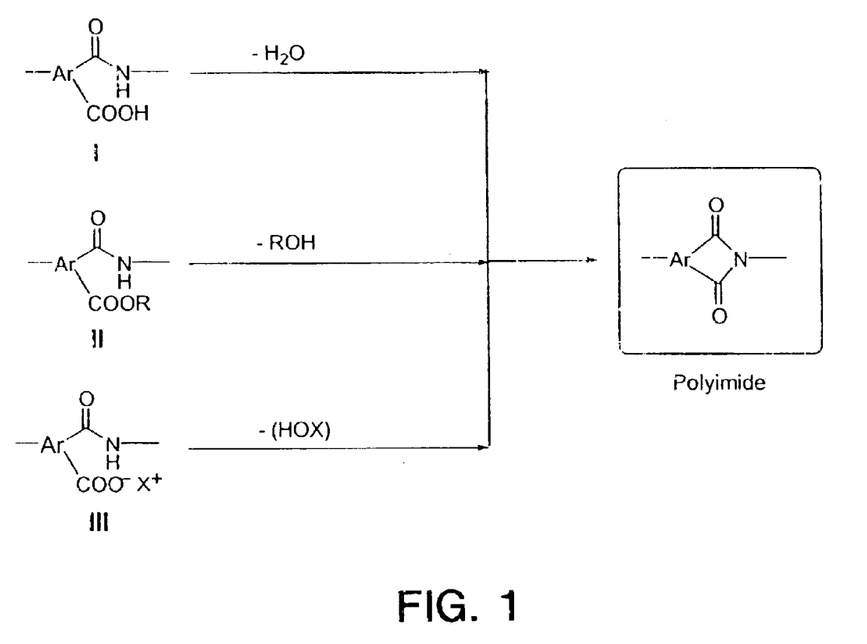
FIG. 1 is a schematic representation of the processes for the preparation of polyimides from different precursors.

Polyimides are high performance polymers with excellent mechanic and thermal properties. However, polyimides with particularly desirable mechanic and thermal characteristics generally have poor solubility in common organic solvents, such as dimethylformamide (DMF), N-methyl-2-pyrrolidone (NMP), and chloroform. Therefore, polyimide articles are generally obtained from their soluble precursors by treating with heat or with chemical dehydrating agents. Three types of precursors have been used for the processing of polyimide materials, as shown in FIG. 1. They are polyamic acid (PA, I), polyamic acid ester (PAE, II) and polyamic acid salt (PAAS, III), respectively.

Polyamic acid (I) can decompose into an amine terminal radical and an acid anhydride terminal radical by depolymerization due to reaction equilibrium. The acid anhydride radical formed will react with water that can be introduced from outside or produced during the imidization and thus will be transformed into dicarboxylic acid that will no long react with amine terminal radical to form covalent bonds. As the result, molecular weight of the polyamic acid will decrease over time when stored. This in turn will effect the mechanical characteristics and the quality of the final polyimide article. The most frequently suggested method to overcome the depolymerization is to store the polyamic acid solution at low temperatures or to use the precursor shortly after its preparation.

Polyamic acid polymers have been used as the intermediate material for the fabrication of asymmetric and composite membranes. The formation of asymmetric membrane is often accomplished through a phase inversion process by contacting polymer solution (dope) with a non solvent. The preferred non solvent is frequently water. Polyamic acid is a hydrophilic polymer that will strongly associate with polar solvents, such as N,N'-dimethylformamide (DMF), N-methyl-2-pyrrolidone (NMP), hexamethylphosphoramide (HMPA), N-acetyl-2-pyrrolidone, N,N'-dimethylacetamide (DMAc) and the like, which are common solvents used for the preparation of polyamic acid solutions. Therefore, the formation of polyamic acid membranes by phase inversion process is essential any nonsolvent is very difficult because of the slow solvent exchange. For example, asymmetric polyimide membranes derived from pyromellitic dianhydride and 4,4'-oxydianiline (PMDA-ODA) required gelation in toluene for 24 hours followed by gellation in dioctyl sebacate for another 24 hours, as described by H. Ohya, T. Ichihara, T. Higashijima, Y. Negishi, "Membrane", 17(1), 42 (1992). Semenova et al. reported that asymmtric membranes from polyamic acid (PMDA-ODA) solutions can.not be prepared by phase inversion into ethanol, 1,4-dioxane, water and ethyleneglycol, due to membrane disintegration upon immersion, see S. I. Semenova, H. Ohya, T. Higashijima, and Y. Negishi, "Membrane", 17(3), 193 (1992).

U.S. Pat. No. 5,510,395 discloses the preparation of a polyimide microporous film from a polyamic acid casting solution formed in a volatile solvent composition by evaporation process. It is difficult to synthesize high molecular weight polyamic acid polymers in the disclosed solvent system. Hence, the mechanical properties of the resultant polyimide are compromised.

U.S. Pat. Nos. 5,725,769 and 5,753,008 disclose a process for the preparation of asymmetric solvent resistant membranes. In the first step the polyamic acid is synthesized in NMP solvent. Then a large amount of glycerin is added to the solution to form the membrane casting solution. The casting solution is then extruded through the orifice of a tube-in-orifice spinneret into a water bath to form the nascent hollow fiber. The polyamic acid hollow fiber is then converted into the polyimide hollow fiber by heat treatment. As pointed out previously, polyamic acid is highly hydrophilic, which makes the solvent exchange slow. Extended time is required to fully exchange the associated NMP solvent by soaking the nascent hollow fiber membrane in water to remove solvent. Any residual solvent can adversely effect membrane porosity during the subsequent heat treatment. However, extensive washing of hollow fibers with water tends to hydrolyze the polyamic acid polymer and the final hollow fiber formed can be brittle.

In U.S. Pat. No. 4,113,628 preparation of asymmetric polyimide hollow fiber membranes is disclosed from the corresponding polyamic acid solutions by quenching the nascent hollow fiber into selected chemical cyclization compositions, such as acetic anhydride and triethylamine in benzene solution. While, the phase separation and imidization processes take place simultaneously, the disclosed process requires the use of large amounts of organic solvents and thus is difficult for commercialization.

U.S. Pat. Nos. 4,440,643 and 5,141,642 disclose the preparation of composite polyimide gas separation membranes from polyamic acid precursors. However, fabrication of reproducible polyimide membranes from polyamic acid precursors is extremely difficult due to the sensitivity of polyamic acids towards temperature and moisture. Furthermore, some polyamic acids are not soluble in mild organic solvents, and all polyamic acids require harsh conditions to complete imidization. For example, temperatures as high as 300° C. are generally required to complete imidization of polyamic acids by thermal treatment. The limited availability of solvent systems and the requirement for high imidization temperatures prohibits the application of polyamic acid precursors as the coating material for the fabrication of composite polyimide membranes when the preferred, readily available polymeric substrates, such as polysulfone are used. To maintain a high level of substrate porosity, the thermal imidization temperature must be lower than the glass transition temperature of the substrate polymer, and most of the commercially employed polymeric substrates have glass transition temperatures below 200° C. (for example, the $T_g$ of polysulfone is about 190° C.).

G. A. Polotskaya et al. disclosed a polyamic acid membrane casting composition that exhibits a lower imidization temperature, see G. A. Polotskaya, et al., Polymer Science, Ser. B., Volume 38, pp281, 1996 (English translation). The composition is formed by combining a polyamic acid dissolved in dimethylacetamide (DMAc) with 0.5–2.0 equivalent amount of benzimidazole. The composition is used to form composite membranes by coating a poly(2,6-dimethyl-1,4-phenylene oxide) (PPO) porous substrate saturated with high aliphatic hydrocarbons. The coating layer is converted to polyimide by heat treatment at 150° C. The disclosed method, however, requires the use of a harsh, high boiling coating solvent. The solvent used is difficult to remove and can damage or destroy the porous substrate. As the result, the composite membrane formed had inferior gas permeation properties. Furthermore, the disclosed method can be applied only to a limited number of solvent resistant substrates.

Polyamic ester (II) is another polyimide precursor utilized extensively that has improved chemical stability and processing ability. The polyamic ester is obtained by esterification of the carboxylic acid. The ester formation prevents the depolymerization that effects the polyamic acid precursors. However, the synthesis of tetracarboxylic acid diester dichloride, an essential monomer for the synthesis of polyamic ester, is very difficult. The monomer is sensitive to moisture and tends to deactivate on prolonged storage.

U.S. Pat. No. 5,952,448 discloses a process for the preparation of partially imidized polyamic ester. The partially imidized polyamic ester is obtained by partial esterification of amic acid radicals of the polyamic acid with a base, such as potassium carbonate, and the esterification agent, such as alkyl halide, followed by imidization of the remaining amic acid radicals. The use of a strong inorganic base can, however, cause depolymerization of the polyamic acid that will effect the mechanic characteristics of polyimide polymer formed.

The temperature required for complete thermal imidization of polyamic ester is even higher than that required for polyamic acid precursors, see for example, Y. Charlie, et al. Polymer, Volume 36, Pages 1315–1320, 1995. The extremely high temperature required for the thermal imidization of polyamic ester is prohibitive for the fabrication of certain polyimide articles, such as porous membranes, from polyamic ester precursors, as the porosity of the precursory asymmetric or composite membrane is destroyed during the high temperature heating process.

Polyamic acid salt (III) precursors are formed by neutralization of the free carboxylic acid group of the polyamic acids with a base, such as a tertiary amine. U.S. Pat. Nos. 4,252,707, 4,290,929, 4,954,608, and 5,719,253 disclose the preparation of polyamic acid tertiary amine solutions. The following publications also disclose the synthesis of polyamic acid salts: R. J. W. Reynolds and J. D. Seddon, Journal of Polymer Science, Part C, Volume 23, pp45, 1968; and J. A. Kreuz, A. L. Endrey, F. P. Gay, and C. E. Sroog, Journal of Polymer Science, Part A-1, Volume 4, pp 2607, 1966; Y. Echigo, N. Miki, and I. Tomioka, Journal of Polymer Science, Polymer Chemistry, Volume 35, pp2493, 1997. U.S. Pat. No. 4,428,977 discloses the preparation of ammonium salt of partially imidized polyamic acids, which are essentially very low molecular weight oligomers.

In co-pending, commonly assigned U.S. Pat. No. 6,497,747, fabrication of polyimide membranes from precursory polyamic acid salts (PAAS) is disclosed. Specifically, said patent application discloses preparation of composite and asymmetric polyimide membranes from highly soluble PAAS polymers. Despite the intrinsic simplicity and convenience of forming polyimide membranes from PAAS precursors, the use of PAAS polymers in some embodiments can still be problematic. In particular, the evolution of large amounts of volatile components during the imidization of the PAAS polymers can have drawbacks, such as build up of residue stresses and excessive shrinkage.

SUMMARY OF THE INVENTION

One object of the present invention is to provide novel polyimide precursors, (polyimide amic acid salt (PIAAS) polymers), that exhibit improved stability, solubility and processing ability. The PIAAS polymers of the present invention include precursors for aromatic and aliphatic polyimides, preferably aromatic polyimides. The preferred PIAAS polymers have the following general structure.

IV where X is a protonated tertiary amine, a quaternary amine, a phosphonium ion, a sulfonium ion, or a mixture thereof and m and n can each be in the range of 0.025 to 0.95.

Ar and Ar' are aliphatic or aromatic radicals. Preferably, at least 85% of said Ar and Ar' radicals are aromatic radicals, and most preferably 100% of said radicals are aromatic radicals.

Another object of the present invention is to provide industrially feasible processes for the manufacturing of the said polyimide amic acid salt polymers.

Still another object of the present invention is to provide a novel process for the fabrication of composite polyimide membranes.

A further object of the present invention is to provide novel, commercially viable processes for the manufacturing of asymmetric microporous polyimide membranes, including solvent resistant micro porous polyimide membranes.

A further object of the present invention is to provide novel precursory casting compositions for preparation of solvent resistant polyimide membranes. The novel precursory casting compositions are hydrolytically stable and have long shelf life.

DETAILED DESCRIPTION

For the purposes of this disclosure, the phrase "degree of imidization" is the percentage of amic acid radicals inside the polymer chain that have been converted into imide radicals.

1. Polyimide Amic Acid Salt Polymers

The present invention relates to novel precursors (IV) for the formation of polyimides, namely polyimide amic acid salt polymers.

Figure 2:
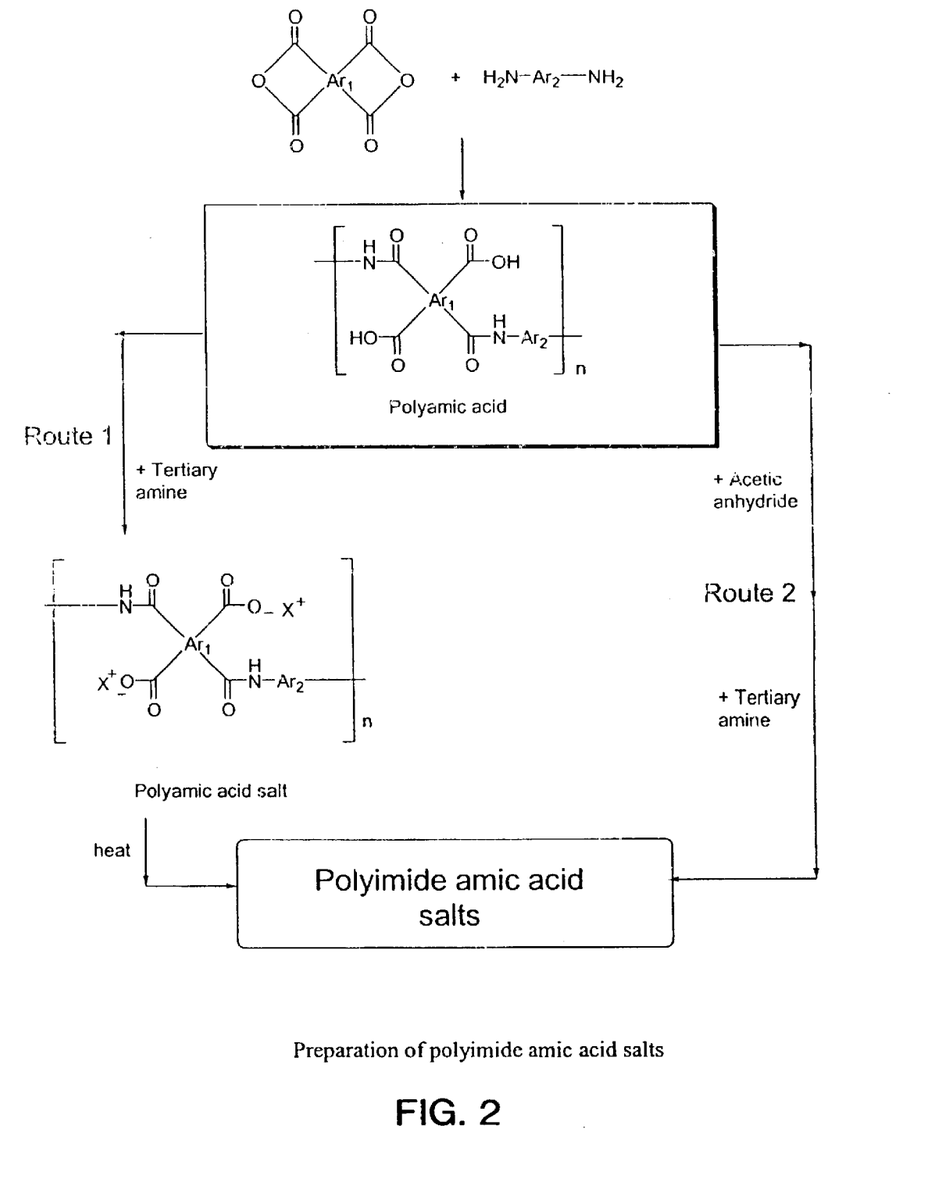
FIG. 2 is a schematic representation of the processes for the preparation of polyimide amic acid salt polymers of present invention.

The PIAAS polymers of present invention are prepared from polyamic acid polymers. PIAAS polymers can be obtained from PAAS polymers by a controlled partial imidization process, such as holding the PAAS polymer solution at elevated temperature for predetermined time to obtain the desired degree of imidization or by adding a predetermined amounts of dehydration agent to the PAAS polymer solution to effect the partial imidization. The two preferred synthetic routes are illustrated in FIG. 2. The controlled chemical imidization is the most preferred process and is shown schematically as route 2 in FIG. 2. The dehydration agent and the base are added to the polyamic acid solution simultaneously or sequentially to form PIAAS polymers with controlled degree of imidization.

The most preferred approach is to add predetermined amount ot the dehydration agent to the polyamic acid solution first. Then, an organic base, such as a tertiary amine, is added to form the amic acid salt and to effect the chemical imidization. It has been found that the degree of imidization can be controlled by the amount of the dehydration agent added. The desired degree of imidization can be obtained by controlling the stoichiometeric molar ratio of the dehydration agent to that of the PAAS. The dehydration agents that can be utilized to form PIAAS polymers of this invention include acid anhydrides, acid chlorides, acetals, and the like. The preferred dehydration agent is acetic anhydride. The PIAAS polymers of this invention can also be prepared by the direct condensation polymerization of a monomer with the preformed imide linkage.

Polyamic acid salts of present invention are prepared by neutralization of polyamic acids with an organic base, such as a tertiary amine. Polyamic acid may be prepared by traditional methods known in the art. For example, polyamic acid can be prepared by reacting an aromatic dianhydride with an aromatic diamine in an aprotic solvent. Aprotic solvents include, but are not limited to N,N'-dimethylformamide (DMF), N,N'-dimethylacetamide (DMAc), dimethylsulfoxide (DMSO), tetrahydrofuran/methanol mixture (THF/MeOH), and the like. Typically, the diamine monomer is dissolved in the solvent first and then the dianhydride is added either in one portion or in small separate portions. The reaction is carried out under an inert atmosphere such as $N_2$. Once a very viscous polyamic acid solution is obtained, the polyamic acid can be converted to PAAS in situ, for example, by adding a base such as a tertiary amine or a tetraalkylamine hydroxide solution to the reaction mixture.

PIAAS polymers of the present invention are depicted by formula IV, and are random copolymers with degree of imidization in the range of 5% to 95%, preferably from 30% to 80%. The preferred PIAAS polymers are aromatic polymers of the following general formula:

Where is independently or mixtures thereof.

—R'— is

—R"— is

Z and Z' are

—H, —CH₃, —CH₂CH₃, —CH₂CH₂CH₃, iso-propyl, iso-butyl, tert-butyl, —Br, —Cl, —F, —NO₂, —CN where —Ar'— is independently or mixtures thereof. Where Ar is defined as above.
—Ar₁— is The counter ions in PIAAS polymers are derived from protonated tertiary amines, quaternary amines, sulfonium ions and phosphonium ions. The preferred counter ions are protonated tertiary amines. Suitable tertiary amines include heterocyclic, alicyclic or aromatic amines or amines of the following general formula: $R_1R_2R_3N$, wherein $R_1$, $R_2$ and $R_3$, may be the same or different and are organic radicals that can be alkyl or aryl radicals having at least 1 to 20 carbon atoms, more preferably from 1 to 15 carbon atoms. Organic radicals can also contain some functional groups such as —Cl, —F, —OH, —CHO, or bond linkages such as —O—, —S—, —CO— or —COO—. Those organic radicals having 15 or fewer carbon atoms are preferred because of their improved solubility in mild solvents. Illustrative examples of suitable amines are trimethylamine, triethylamine, tri-n-propylamine, tri-isopropylamine, N,N-dimethylhexylamine, N,N-dimethyldodecylamine, N,N-ethylethanol-amine, N-methyldiethanolamine, triethanol-amine, tri-n-butyl-amine, tri-n-hexyl-amine, tri-iso-octylamine, N,N,N',N'-tetramethyl-ethylenediamine, DABCO® (1,4-di-aza-bi-cyclo-[2,2,2] octane), pyridine, imidazole, 1,2,4-triazole, benzimidazole, naphthimidazole, purine, quinoline, isoquinoline, pyridazine, phthalazine, quinazoline, cinnoline, naphthylidine, acridine, phenanthridine, benzoquinoline, benzisoquinoline, benzocinnoline, benzophthalazine, benzoquinazoline, phenanthroline, phenazine, carboline, perimidine, 2,2'-dipyridyl, 2,4'-dipyridyl, 4,4'-dipyridyl, 2,2'-diquinolyl, 2-hydroxypyridine, 3-hydroxypyridine, 4-hydroxypyridine, 2-hydroxyquinoline, 3-hydroxyquinoline, 4-hydroxyquin-oline, 5-hydroxyquinoline, 6-hydroxyquinoline, 7-hydroxy-quinoline, 8-hydroxyquinoline, picolinamide, nicotinamide, isonicotinamide, N,N-dimethylnicotinamide, N,N-diethylnicotinamide, N,N-dimethylisonicotinamide, N,N-diethylisonicotinamide, hydroxynicotinic acid, picolinic ester, nicotinic ester, isonicotinic ester, 2-pyridine sulfonamide, 3-pyridine sulfonamide, 4-pyridine sulfonamide, picolinaldehyde, nicotinaldehyde, isonicotinaldehyde, 3-nitropyridine, 3-acetoxypyridine, 2-aminopyridine, 3-aminopyridine, 4-aminopyridine, picolinaldoxime, nicotinaldoxime, isonicotinaldoxime, 2-(hydroxymethyl)pyridine, 3-(hydroxymethyl)pyridine, 4-(hydroxymethyl)pyridine, 4-(hydroxymethyl)pyridine, 3-(hydroxyethyl)pyridine, 4-(hydroxyethyl)pyridine, 3-hydroxy-pyridine-N-oxide, 4-hydroxypyridine-N-oxide, 4-hydroxyquinoline-N-oxide, N-hydroxypyrrole-2,5-dione, N-hydroxyisoindole-1,3-dione, N-hydroxypyrrolidine-2-5-dione, N-hydroxybenz(de)isoquinoline,1,3-dione, and the like. The tertiary amines can be used alone or as a mixture of two or more to form the counter ions in PAAS polymers.

PAAS polymer counter ions can also include tetraalky-lamine ions that can be heterocyclic, alicyclic, or aromatic amines or amines of the following general formula: $R_1R_2R_3R_4N^+$, wherein $R_1$ through $R_4$ can be the same or different and are organic radicals that can be alkyl or aryl radicals having at least 1 to 20 carbon atoms, more preferably from 1 to 15 carbon atoms. Organic radicals can also contain some functional groups such as —Cl, —F, —OH, —CHO, or bond linkages such as —O—, —S—, —CO— or —COO—. Those organic radicals having 15 or fewer carbon atoms are preferred because of their improved solubility in mild solvents. Further, these materials have better membrane forming characteristics since they are less susceptible to cracking. Illustrative but not limiting examples are tetramethyl-ammonium, tetraethyl-ammonium, tetra-n-propyl-ammonium, tetra-n-butyl-ammonium, trimethylhexyl-ammonium, trimethyldodecyl-ammonium, trimethylbenzyl-ammonium. These quaternary amine ions can be used either alone or in a mixture of two or more to form the counter ions in PAAS polymer. Quaternary amine ions can be further used in a mixture of counter ions such as protonated tertiary amines.

Tertiary and quaternary polyamic acid salts are the preferred embodiments of the present invention. However, other polyamic acid salts, such as sulfonium salts and phosphonium salts, are also within the scope of the present invention. Furthermore, the PAAS polymers of this invention can comprise a mixture of any of the aforementioned salts.

The amount of neutralized carboxylic acid groups in the precursory PIAAS polymers can be in the range of 10 to 100%, preferably in the range of 30 to 100%. However, PIAAS membrane casting formulations can contain tertiary amines or tetraalkylammonium hydroxide in excess of 100% neutralization. Polyimides obtained from PIAAS precursors do not differ from polyimides prepared from polyamic acid precursors (FIG. 1, (I)) in their respective chemical structures. However, there are many advantages associated with the novel precursors disclosed in the present invention.

PIAAS polymer solutions are hydrolytically stable and do not form gels even at very high solution concentrations, such as 35% solids and above. Conversely, gelling is common for polyamic acid solutions. For example, a polyamic acid solution in NMP with 25% solids content of polyamic acid derived from PMDA-ODA will gel in one week at room temperature. However, surprisingly, no visible change was observed for a 40% polyimide amic acid salt derived from PMDA-ODA and tributylamine with the same solid content after three months storage at room temperature. Thus, PIAAS polymers can be stored either in their isolated form or in their solutions for a long time.

PIAAS polymers have high solubility in mild organic solvents. It has been found that PIAAS polymers with imidization degrees of up to 85% can be dissolved in methanol, ethanol, water and the like with the addition of small amounts of tertiary amines, such as triethylamine. We should note that PIAAS polymers with the degree of imidization of 70% or below are preferred when the above mentioned solvents are utilized.

The solubility of PIAAS polymers can be adjusted by adjusting the imidization degree and through the counter ion selection. Generally, the smaller or more polar the counter ion, the more soluble the PIAAS polymer. Thus, a PIAAS polymer with protonated tributylamine as the counter ion is less soluble in methanol than a PIAAS polymer with protonated triethylamine as the counter ion. It was also found that the solubility of the precursory PIAAS polymers in casting solvents can be further enhanced by introducing small amounts of tertiary amines into the solvent mixture in excess of the stoichiometric ratio required to form polyamic acid salt.

Preferred casting solvents for the formation of composite membranes include common organic solvents with boiling points below 250° C., preferably below 200° C., most preferably below 150° C., such as alcohols or ketones and their mixtures with water. Illustrative, but not limiting, examples are methanol, ethanol, n-propanol, isopropanol, n-butanol, n-pentanol, n-hexanol, cyclohexanol, ethylene glycol, ethylene glycol monomethylether, 2,2'-dimethoxyethyl ether, acetone, methy ethyl ketone, tetrahydrofuran, dioxane, and the like or mixtures thereof and their mixtures with water and tertiary amines.

Polyimides obtained from PIAAS precursors display less shrinkage during imidization than polyimides prepared from PAAS precursors. In addition, PAAS precursors release larger amounts of small volatile molecules than PIAAS precursers during the imidization process. Thus, polyimide articles prepared from PIAAS precursors exhibit less residue stress as compared with polyimide articles prepared from PAAS precursors. Relatively mild conditions are required to convert the PIAAS precursors into polyimides. For example, the temperatures required to convert a PIAAS polymer into the polyimide by heat treatment are in the range of 100 to 300° C., preferably in the range of 120 to 200° C. Indeed, was found unexpectedly that in some embodiments complete conversion into the polyimide could be obtained at temperatures as low as 100° C. Heat treatments can be accomplished by microwave, radio frequency (RF) or infrared heating, or by conveying the PAAS precursors through a controlled temperature heating oven, preferably at a constant speed (the oven can contain several temperature zones), or by placing membranes into a heating oven and executing a controlled heat treating protocol.

In some embodiments, a multi-step process that combines the heating procedures described above is advantageously employed. When the heat treating oven is employed, the heat treatment time can be in the range of one second to 100 hours, preferably from ten seconds to thirty 30 hours the length of the treatment being dependent the temperature applied as well as on the PIAAS polymer structure. Advantageously, a step-wise heating or temperature ramp-up process can be employed to avoid excessively fast release of the volatile species formed during the imidization reaction that can otherwise cause foam formation or produce large voids in the polyimide product. For example, the precursory PIAAS polymer is first treated at a relatively low temperature of about 100° C. followed by a final heat treatment at about 150° C. Some PIAAS precursors may undergo degradation when heated in air at elevated temperatures. In such cases, it is preferred that the heat treatment of PIAAS precursors is carried out in an inert gas atmosphere, such as a nitrogen atmosphere, or under vacuum. The rate of temperature increase during the heat treatment process can effect the gas permeation characteristics of the polyimide membrane. It was found that in some embodiments, it is advantageous to employ a high rate of temperature increase that can lead to improved fast gas permeance as long as excessive foaming and void formation is avoided. The optimal rate depends on the particular PAAS structure and the physical characteristics of the article, and can be determined by those skilled in the art through routine experimentation.

Alternatively, imidization of the precursor can be carried out by treating the precurser with a dehydration agent, preferably an organic anhydride, such as acetic anhydride, propionic anhydride, or the like. The chemical treatment may be carried out at ambient temperature. If necessary, a slightly elevated temperature or a catalyst may be utilized.

2. Polyimide Membranes

The polyimide amic acid salt polymers of the present invention are particularly useful in preparation of polyimide fluid separation membranes. Solvent resistant polyimide membranes derived from PMDA, and/or 4,4'-benzophenonetetracarboxylic dianhydride (BTDA), and/or biphenyltetracarboxylic dianhydride (BPDA) and 4,4'-oxydianline (ODA) can be conveniently prepared from PIAAS precursors. The porous solvent resistant polyimide membranes are useful for a variety of liquid separations, such as ultrafiltration separations in aggressive solvent mixtures, and are useful as substrates for the fabrication of composite membranes for gas separations.

Polymeric separation membranes are generally fabricated into an asymmetric or a composite configuration with dense thin separation layers. The membranes can be further configured into flat sheets or into hollow fibers.

The characteristics of PIAAS polymers are extremely useful for the fabrication of polyimide membranes. The fact that PIAAS polymers are highly soluble in mild solvents, such as alcohols, is extremely useful for the fabrication of polyimide composite membranes. On the other hand, the fact that the solubility of PIAAS polymers can be adjusted by the degree of imidization and through counter ion selection and that the PIAAS polymers form stable casting solutions is extremely useful for the fabrication of asymmetric membranes.

PIAAS polymers can be shaped into flat sheet, tubular or hollow fiber forms. The porous polyimide membranes of this invention can be utilized directly in separation processes or used as substrates for the preparation of composite membranes. In preferred embodiments asymmetric porous membranes are formed and used directly for gas separations. Porous polyimide membranes are generally manufactured by the so-called phase inversion technique well known in the art.

In the present invention, the phase inversion can be induced by contacting PIAAS polymer solution with a nonsolvent or by a thermally induced phase separation, TIPS. Typically, a PIAAS polymer is dissolved in a suitable solvent or mixture of solvents and fabricated into a desired membrane shape such as flat sheet, tubular or hollow fiber. The porous PIAAS polymer membrane is formed by contacting the cast membrane shape with a nonsolvent. By the term "nonsolvent" we mean a solvent that cannot dissolve the polymer but has good miscibility with the solvent used to dissolve the polymer.

The process of this invention is most useful for the preparation of porous asymmetric integrally skinned membranes for gas separations wherein the polyimide material of the membrane substantially effects the separation. Such membranes contain nonporous dense regions within the membrane structure that are typically located at the membrane surface, but can be situated somewhat away from the surface sandwiched between porous nondiscriminating regions. These dense regions, or surface layers, are preferably nonporous or of extremely low surface porosity typically below $10^{-5}$, preferably below $10^{-6}$. Surface porosity is defined as a ratio of surface area occupied by pores to the total surface area of the membrane. The dense flow discriminating region is very thin and is frequently below □□□□Å, preferably below 500 Å.

Examples of preparation of porous asymmetric gas separation membranes can be found in U.S. Pat. Nos. 4,230,463; 5,085,676; and 5,181,940. The porous asymmetric membranes of the present invention are formed by the following general process: (a) a membrane casting solution is formed containing the PIAAS polymer in at least one polar solvent; b) the casting solution is shaped into a membrane configuration such as a flat sheet, tubular or a hollow fiber; (c) the membrane configuration is conveyed through an evaporation zone; (d) the cast membrane configuration is contacted with a coagulation fluid to form a porous solidified PIAAS membrane; (e) the PIAAS membrane is washed to remove residual solvent; (f) the PIAAS membrane is dried, and (g) the PIAAS membrane is converted into the polyimide membrane by thermal or chemical treatments.

It is well known in the art that the atmosphere of the evaporation zone and the duration of the evaporation step (c) can effect membrane structure and performance. In some embodiments, the process step (c) is totally omitted and the cast membrane is subjected directly to the solidification step (d). It is also well known in the art that it may be advantageous to dehydrate membranes solidified by coagulation into water utilizing solvent exchange procedures as part of the drying step as, for example, disclosed in U.S. Pat. Nos. 4,080,743 and 4,120,098. Thus it may be advantageous in some embodiments of this invention to subject the solidified and washed PIAAS membranes of step (e) to a solvent exchange dehydration process. The phrase "the PIAAS membrane is dried" in step (f) is inclusive of such solvent exchange dehydration processes.

The asymmetric polyimide membranes of this invention are formed from the precursory PIAAS asymmetric membranes either by a heat treatment or by a chemical treatment. The heat treatment process is preferred. The low thermal imidization temperature required for the process of the invention offers the advantage of maintaining the porosity of the asymmetric membrane intact. If a high imidization temperature must be used, as is the case for prior art polyamic acid and polyamic acid ester precursors, the porous structure tends to collapse and only a poor membrane is frequently obtained.

The hollow fiber configuration is a preferred membrane configuration for the polyimide membranes of the present invention because it allows for a high packing density of membrane area to be incorporated into a given volume. The porous polyimide hollow fibers of the present invention are prepared from porous PIAAS hollow fiber precursors that are produced by a dry-wet spinning process well known in the art. Such a process uses a solution, commonly referred to as a sol, a spinning dope, or spinning solution, comprising a polymer mixed with a solvent vehicle comprised of one or more components to yield a mixture with a viscosity suitable for hollow fiber spinning. The sol usually consists of at least one solvent oapabie of dissolving the polymer along with one or more additives tnat may be nonsolvents, as is well known in the art. The hollow fibers are prepared by spinning polymeric solutions through an evaporation zone, frequently referred to as air gap, followed by solidification in a coagulation media.

The fiber forming solution or sols are prepared by dissolving the PIAAS polymer in a solvent system that contains additives such as nonsolvents, pore-forming agents, or surfactants. The PIAAS polymers of the present invention can be conveniently dissolved in a number of simple common solvents such as alcohols, aprotic solvents such as dimethylformamide and N-methylpyrrolidinone and their mixtures with water. The hollow fibers are solidified in a coagulation media that is typically a nonsolvent for the PIAAS polymer. The preferred coagulation media is water. In some embodiments the coagulation media is a solvent/nonsolvent mixture.

The instant invention is very useful in the manufacture of composite gas separation membranes. A composite membrane is frequently the membrane configuration of choice because it offers the advantage of using inexpensive, commercially available polymers as the porous substrate and a small amount of a specialty separation polymer as a coating layer. It is known in the art that one can tailor the gas separation properties of the composite membrane by changing the material of the thin separation layer, which can be a specialty polymer with advanced separation properties. Examples of methods of composite membrane preparation are provided in U.S. Pat. Nos. 5,076,916; 4,840,819; 4,826,599; 4,756,932 and 4,467,001. The substrate material used in preparing the composite membranes of the present invention can be a solid natural or synthetic substance; it can be further an organic or inorganic substance. The selection of the material may be based on heat resistance, solvent resistance, and/or mechanical strength. The selection of material may be further effected by the intended separation process; for example, whether the substrate material is intended to significantly effect the separation. Examples of suitable substrate materials include, but are not limited to, aromatic polyamides, aliphatic polyamides, polyesters, polycarbonates, copolycarbonate esters, polyethers, polyetherketones, polyetherimides, polyethersulfones, polyetheresters, polysulfones, polyvinylidene fluoride, polybenzimidazoles, polybenzoxazoles, polyacrylonitrile, polyazoaroaromatics, poly(2,6-dimethylphenylene oxide), polyphenylene oxides, polyureas, polyurethanes, polyhydrazides, polyazomethines, polyacetals, cellulosic derivatives cellulose acetates, cellulose nitrate, ethyl cellulose, styrene-acrylonitrile copolymers, brominated poly (xylene oxide), sulfonated poly(xylylene oxide), polyquinoxaline, polyamide imides, polyamide esters, polysiloxanes, polyacetylenes such as poly (trimethylsilylpropyne), polyphosphazenes, polyolefines such as polyethylene, polypropylene and poly(4-methylpentene), polyphenylenes, polyimides, polyesters and so called ladder polymers, blends thereof, copolymers thereof, substituted polymers thereof, and the like. The use of inorganic substrates including, but not limited to carbon, ceramic and silicas is also contemplated.

The preferred substrate configuration is a hollow fiber configuration that is used to form the composite polyimide hollow fiber membrane of the present invention. The substrate is preferentially porous and may contain up to 90% void volume and preferably about 20 to 70% based on the superficial volume. It is well known in the art that the coated surface of the substrate may be less porous or comprised of a small pore size than the bulk porosity. The substrate can be further precoated by a gutter layer, or contain solvents and nonsolvents therein to promote thin film coating layer formation. Mild solvent systems can be advantageously utilized in PIAAS composite membrane preparation. Such solvents generally include common organic solvents with boiling points lower than 200° C. The boiling points of solvents can be higher if the solvent is removed by a coagulation process. Illustrative, but not limited, examples are water, methanol, ethanol, n-propanol, isopropanol, n-butanol, n-pentanol, n-hexanol, cyclohexanol, ethylene glycol, ethylene glycol monomethylether, 2,2'-dimethoxyethyl ether, acetone, methy ethyl ketone, tetrahydrofuran, dioxane, and the like or mixtures thereof. The solvent may contain up to 20% by volume of tertiary amines and further an imidization catalyst.

The preferred composite membranes of the present invention are fabricated by the following process: (1) a coating solution of the PIAAS precursor is formed in a solvent system; (2) the coating solution is applied to a porous substrate to form a coating layer; (3) the coating layer is solidified by drying or by immersing the coated substrate into a nonsolvent, in some embodiments a combination of drying and immersion into a nonsolvent can be employed; (4) the solidified PIAAS composite membrane is treated either by thermal or chemical means to convert it into a composite polyimide gas separation membrane. Coating applicators well known in the art can be utilized to apply PAAS polymer coating solution to the substrate. The coating layer can be solidified by drying, for example, by transporting the coated substrate through a drying oven. Alternatively the coating layer can be solidified by immersing the coated substrate into a nonsolvent, as described in U.S. Pat. No. 4,826,599. It is well understood that the solidification by immersion into a nonsolvent can be preceded by partial evaporation. In addition to solvents, the PIAAS coating solutions can contain nonsolvents, surfactants and additives to promote optimal composite layer formation.

It is well known in the art that polymeric gas separation membranes can be treated to repair residual defects/imperfections. The treatments are frequently referred to generically as caulking and may include the application of a thin layer of a high gas permeability material, such as silicon rubber, over the thin membrane gas separation layer to block residual imperfections; it can further include solvent and surfactant treatments to collapse and block the residual surface pores, and the like caulking treatments. Examples of caulking methods are disclosed in U.S. Pat. Nos. 4,230,463; 4,767,422, and 5,034,024 incorporated herein by reference. The use of the term caulking herein is inclusive of all known methods of defect repair in gas separation membranes. The caulking process to block any residual imperfections in the gas separation layers of the composite and asymmetric membranes of the present invention can be carried out after the PIAAS precursor membrane has been formed, after the PIAAS precursor membrane has been converted into the polyimide membrane, or both.

The polyimide membranes formed by the methods of the present invention are typically more than 50% imidized, preferably more than 80% imidized, most preferably essentially 100% imidized.

The polyimide membranes of the present invention are useful for numerous fluid separation applications including liquid, gas/liquid, vapor and/or gas separations. Gas separations include, but are not limited to oxygen/nitrogen separation, separation of hydrogen from hydrogen-containing gas streams, separation of carbon dioxide from carbon dioxide-containing gas streams, such as natural gas sweetening, hydrogen sulfide removal from natural gas streams, helium purification and gas drying.

The following examples will serve to illustrate the utility of this invention but should not be construed as limiting. The gas permeability of the flat sheet polyimide membranes was determined by the following procedure. In the test, the membrane to be tested was sandwiched between two aluminum foils exposing a 2.54 cm diameter area, placed in a permeation cell and sealed with epoxy resin. The downstream side of the cell was evacuated up to $2 \times 10^{-2}$ mmHg and the permeate feed gas was introduced from the upstream side. The pressure of the permeate gas on the downstream side was measured using an MKS-Baratron pressure transducer. The permeability coefficient P was calculated from the steady-state gas permeation rate according to the equation:

$$P = C \times V \times L \times dp/dt \times 1/h$$

C=constant
V=volume of collection receiver
L=thickness of film
h=upstream pressure
dp/dt=slope of steady-state line The permeability coefficient P is reported in Barrer units (1 Barrer=$10^{-10}$ cm$^3$ cm/cm$^2$ cmHg sec).

EXAMPLE 1

A 500 mL three-neck round-bottom flask equipped with a nitrogen inlet and a mechanical stirrer was charged with 10.01 g of oxy-4,4'-dianiline (ODA) and 100 mL of NMP. Once the dianiline was fully dissolved, 22.21 g of hexafluoroisopropylidene diphthalic anhydride (6FDA) powder was added by washing it down with 50 mL of NMP. Within one hour, the reaction mixture became very viscous and 50 mL of NMP was added to dilute the solution. The reaction mixture was stirred at room temperature for an additional 2 hours and 7.55 mL (amounts calculated to effect 80% imidization) of acetic anhydride was added to the reaction mixture, which was stirred for an additional 1 hour at room temperature. At this point, 26 mL of triethylamine was added along with 50 mL of NMP. The reaction mixture was further stirred at room temperature overnight to effect the imidization. The solid polymer was recovered by precipitation into a large amount of isopropanol (IPA) and dried. The thus obtained PIAAS polymer is denoted as 6FDA-ODA-80/Et$_3$N. The actual degree of imidization determined by FTIR was 78%. The solubility characteristics of the polymer are shown in Table 1.

EXAMPLES 2–6

PIAAS polymers with different degrees of imidization were prepared following the general procedure described in Example 1 by changing the amount of acetic anhydride added. The comparison between the actual degree of imidization as measured by FTIR and theoretical degree of imidization through stoicheometry is shown in Table 1. The solubility of PIAAS polymers in a number of solvents is also shown in Table 1.

Table 1. 6FDA-ODA/Et$_3$N PIAAS polymers and their solubility

TABLE 1

6FDA-ODA/Et$_3$N PIAAS polymers and their solubility

| Example | Theoretic degree of imidization(%) | Measured degree of imidization(%) | Methanol | MeOH+ Et$_3$N[a] | DMF |
|---|---|---|---|---|---|
| 1 | 80 | 78 | − | − | ++ |
| 2 | 60 | 57 | − | + | ++ |
| 3 | 50 | 48 | +'−' | + | ++ |
| 4 | 40 | 42 | +'−' | ++ | ++ |
| 5 | 30 | 28 | + | ++ | ++ |
| 6 | 20 | 21 | + | ++ | ++ |

[a]1% of Et$_3$N by volume in methanol;
−: insoluble;
+−: slightly soluble or swell;
+: soluble;
++: very soluble.

a: 1% of Et$_3$N by volume in methanol;
··: insoluble;
+−: slightly soluble or swell;
+: soluble;
++: very soluble.

COMPARATIVE EXAMPLE 1

The film of 6FDA-ODA/Et$_3$N PAAS polymer was cast from 10% methanol solution on a clean glass and dried in a glove bag at room temperature. The PAAS polymer film was released from the glass and further dried under vacuum at 50° C. overnight. The polyimide film was obtained by treating the PAAS film at 80° C. for 8 hours and then at 150° C. for 24 hours under vacuum. The gas permeation properties of the polyimide film were tested at 30° C. and the results listed in Tables 2

EXAMPLES 7–9

6FDA-ODA polyimide films were prepared from PIAAS precursors with different degrees of imidization essentially as described in Comparative Example 1 except that DMF was used as the casting solvent in Example 9. The gas permeation properties of these polyimide films were tested at 30° C. and the results listed in Tables 2 and 3.

COMPARATIVE EXAMPLE 2

The 6FDA-ODA polyimide film was prepared from fully imidized polyimide polymer using DMF as the solvent. The gas permeation properties of the polyimide film were tested at 30° C. and the results listed in Tables 2 and 3.

The gas permeation data summarized in Tables 2 and 3 indicate that polyimides prepared by the process of instant invention exhibit similar or superior separation characteristics to polyimides prepared by conventional processes.

TABLE 2

Gas permeability of 6FDA-ODA polyimide and 6FDA-ODA polyimides derived from PAAS and PIAAS precursors with different degrees of imidization.
(Permeability in Barrers at 30° C.).

| Example | Partially Imidized PAAS Precursors (imidization degree, %) | P(He) | P($O_2$) | P($N_2$) | P($CH_4$) | P($CO_2$) |
|---|---|---|---|---|---|---|
| Comp. 1 | 0 | 38.1 | 4.5 | 0.9 | 0.58 | 24.2 |
| 7 | 50 | 33.4 | 2.9 | 0.5 | 0.28 | 14.2 |
| 8 | 60 | 37.2 | 2.7 | 0.43 | 0.23 | 12.4 |
| 9 | 80 | 41.4 | 3.1 | 0.51 | 0.23 | 14.4 |
| Comp. 2 | 100 | 29.3 | 2.3 | 0.41 | 0.23 | 10.7 |

TABLE 3

Gas selectivity of 6FDA-ODA polyimide and GFDA-ODA polyimides derived from PAAS and PIAAS precursors with different degrees of imidization.
(Measured at 30° C.).

| Example | Partially Imidized PAAS Precursors (imidization degree, %) | P(He)/ P(N2) | P($O_2$)/ P(N2) | P(CO2)/ P($N_2$) | P(He)/ P($CH_4$) | P($CO_2$)/ P(CH4) |
|---|---|---|---|---|---|---|
| Comp. 1 | 0 | 42 | 5.0 | 27 | 66 | 42 |
| 7 | 50 | 66 | 5.7 | 28 | 118 | 50 |
| 8 | 60 | 86 | 6.2 | 29 | 164 | 54 |
| 9 | 80 | 81 | 6.0 | 28 | 177 | 62 |
| Comp. 2 | 100 | 72 | 5.8 | 26 | 128 | 47 |

EXAMPLE 10

A 2 L reaction kettle equipped with a nitrogen inlet and a mechanical stirrer was charged with 60.1 g of ODA and 200 g of DMF. Once the dianiline was fully dissolved, 64.9 g of pyromellitic dianhydride (PMDA) powder was added in several portions and washed down with 50 g of DMF. The reaction mixture was stirred at room temperature for an additional 2 hours and 22.5 mL (amounts calculated to effect 40% imidization) of acetic anhydride was added along with 50 g of DMF into the reaction mixture which was stirred for an additional 1.5 hours at room temperature. At this point, 143 mL of tributylamine was added in several portions. The reaction mixture was further stirred at room temperature overnight to complete the imidization. The solids content of the solution based on the polyimide amic acid salt was 35%.

The solution was degassed and used as a casting solution to prepare asymmetric membranes. Asymmetric membranes were prepared by casting solution on a glass plate followed by quenching in water. The membranes were left immersed in water for 24 hours to fully exchange the solvents and then air-dried. The precursor membranes were then converted into polyimide membranes by heat treating at 80° C. for 8 hours and then at 150° C. for 24 hours under vacuum. The gas permeation properties (P/T) of the membrane were as follows:

He: 11.9 GPU;
$O_2$: 6.1 GPU;
$N_2$: 6.6 GPU.

EXAMPLE 11

An asymmetric precursory membrane was prepared following the procedure described in Example 10 except the solids content of the casting solution was 18% based on the polyimide amic acid salt. The gas permeation properties (P/T) of the precursory membrane were as follows:

He: 12,913 GPU;
$O_2$: 7,232 GPU;
$N_2$: 8,514 GPU.

The polyimide membrane obtained by thermal imidization of the PIAAS precursory membrane following the procedure described in Example 10 exhibited the following gas permeation properties (P/T):

He: 25,240 GPU;
$O_2$: 14,210 GPU;
$N_2$: 12,980 GPU.

Figure 3:
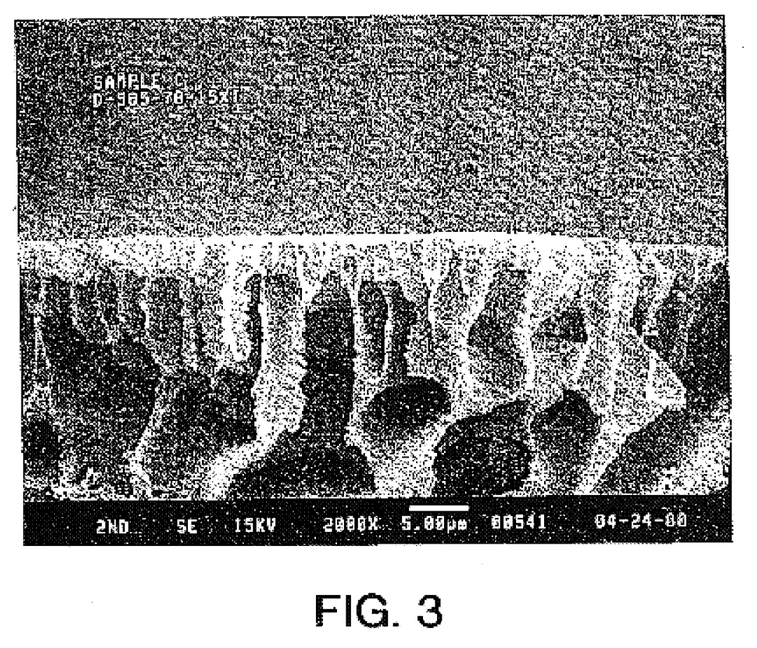
FIG. 3 and FIG. 4 are scanning electron photo micrographs of a solvent resistant porous polyimide asymmetric membrane obtained from the PIAAS precursor (cross section and surface, respectively). The PIAAS (40% imidized) was derived from pyromellitic dianhydride, 4,4'-oxydianiline (PMDA-ODA) and tributylamine in DMF.
Figure 4:
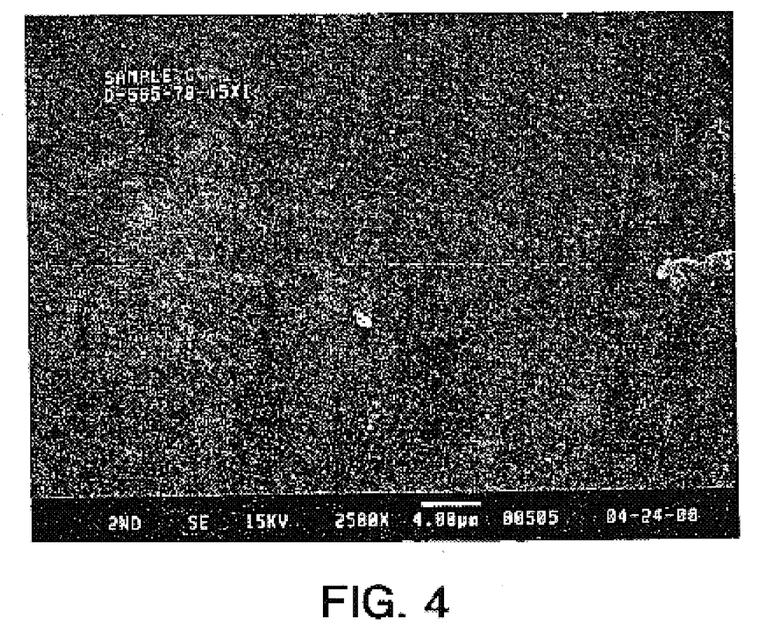

FIGS. 3 and 4 are scanning electron photo micrographs of the cross section and the surface of the polyimide membrane respectively.

EXAMPLE 12

A PIAAS spinning dope was prepared according to the following procedure. 2500 g of DMF and 300.5 g of ODA were added to a glass kettle equipped with a mechanic stirrer and a nitrogen inlet. The mixture was stirred at 635 rpm until ODA was dissolved. A total of 324.5 g of PMDA was added to the reaction kettle over a period of 1 hour. The mixture was stirred at room temperature for an additional 2 hours. At this point, 112.5 mL of acetic anhydride was added into the mixture, which was stirred for 1 additional hour. Finally, 715 mL of tributylamine was added to the kettle in several portions and the mixture was stirred overnight.

The resulting dope consisted of PIAAS polymer with a 40% degree of imidization. The solution had a viscosity of 24,240 cps at 24° C.

The aforementioned spin dope was deaerated, filtered, and pumped through a tube-in-orifice spinnerette having an orifice diameter of 0.102 cm and an injection tube outside diameter of 0.051 cm at a rate of 4.3 cc/min and at a temperature of 26° C. Simultaneously, a core fluid comprised of 96 parts by weight NMP and 4 parts by weight of deionized water was delivered to the core of the injection tube at a rate of 2.4 cc/min to produce a nascent hollow filament stream. The spinnerette was completely enclosed in a vacuum chamber in which the vacuum level was 14 cm Hg.

The hollow filament stream traveled for a distance of 2.5 cm, whereupon it entered water based quench bath and then was drawn at a speed of 30.5 meters/min through said quench bath maintained at a temperature of 25° C.

The resulting asymmetric PIAAS hollow fiber was washed to remove residual solvent and dried. Sample of the hollow fiber membrane, which had an outside diameter of 0.046 cm and an inside diameter of 0.028 cm were fabricated into modules containing 8 hollow fibers of about 40.5 cm in length in order to determine the gas transmission characteristics of the membrane. It was determined that this membrane had a pure helium permeability of 259 GPU and a pure nitrogen permeability of 141 GPU.

Final polyimide hollow fiber was obtained by heat treating the obtained PIAAS hollow diber at 80° C. for 8 hours and then at 150° C. for 24 hours under vacuum. The hollow fiber obtained was stable in aggressive solvents, such as NMP, DMF, and the like.

Figure 5:
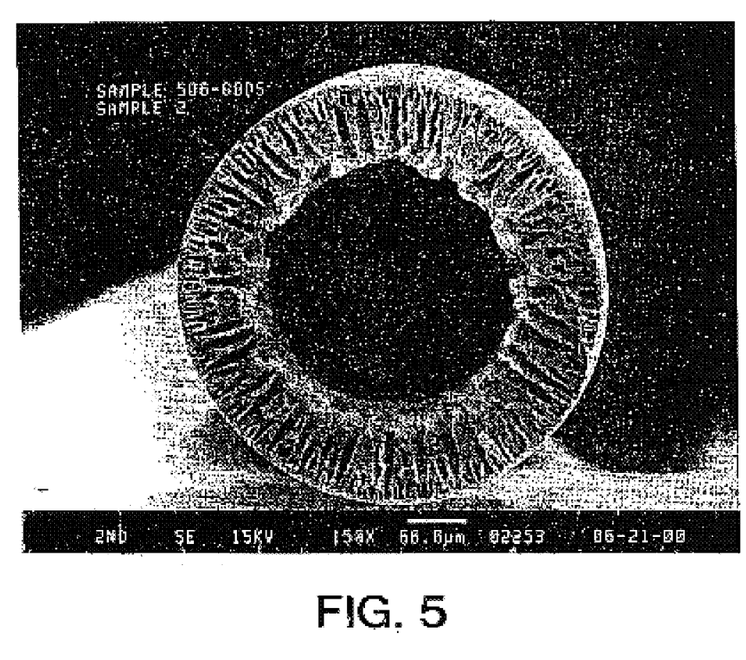
FIG. 5 is a scanning electron photo micrograph of the cross section of a PIAAS hollow fiber. The PIAAS polymer was prepared from pyromellitic dianhydride, 4,4'-oxydianiline (PMDA-ODA) and tributylamine in DMF.
Figure 6:
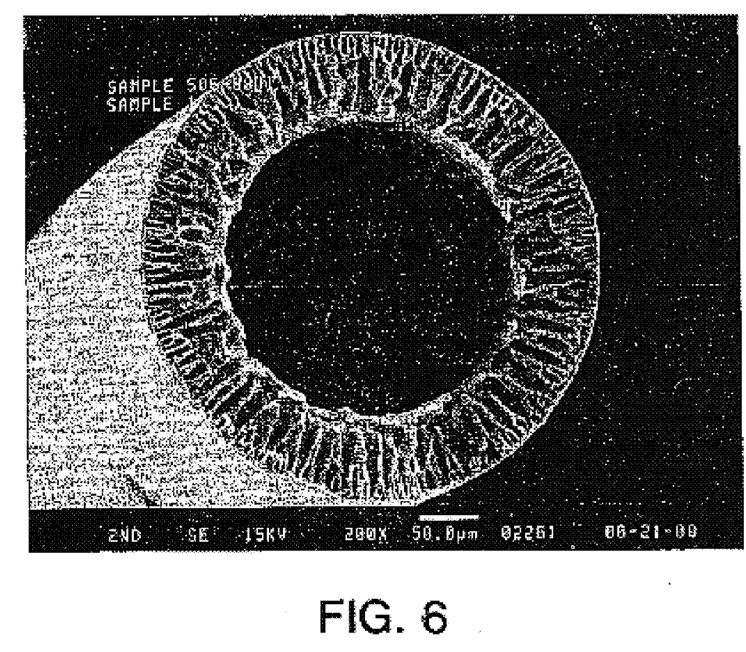
FIG. 6 is a scanning electron photo micrograph of the cross section of the solvent resistant polyimide hollow fiber obtained by thermal imidization of the PIAAS hollow fiber illustrated in FIG. 5.

FIGS. 5 and 6 are scanning electron photo micrographs of the cross sections of the PIAAS and polyimide hollow fibers respectively.

Accordingly, specific features of the present invention are shown in one or more of the drawings or disclosed as illustrative above for convenience only, as such features may be combined with other features in accordance with the invention. Those skilled in the art will recognize other embodiments which may be utilized in the practice of the invention and which are intended to be included within the scope of the claims appended hereto.

What is claimed is:

1. A process for separating one or more gases from a mixture of gases comprising the steps of bringing a gaseous mixture into contact with a first side of a polyimide gas separation membrane such that a first portion of said gas mixture permeates to a second side of said membrane and a second portion of said gas mixture is collected as a nonpermeate, said first portion of said gas mixture being enriched in one or more components over that of said second portion of said gas mixture, wherein said polyimide gas separation membrane is formed via thermal or chemical imidization from a polyimide imide amic acid salt precursor.

2. The process of claim 1 wherein said polyimide membrane is a composite membrane formed by the following process: a) forming a coating solution of a polyimide amic acid salt polymer in a solvent system; b) applying said coating solution to a porous substrate to form a coating layer; c) solidifying said coating layer by drying or by immersing the coated substrate into a non solvent; d) converting the solidified composite polyimide amic acid salt membrane into final polyimide membrane by thermal or chemical treatment.

3. The process of claim 2 wherein said solvent system is selected from: (a) one or more alcohols, (b) mixtures of one or more alcohols with tertiary amines, (c) mixtures of one or more alcohols with water and (d) mixtures of alcohols with tertiary amines and water.

4. The process of claim 2 wherein said porous substrate is a hollow fiber.

5. The process of claim 4 wherein said hollow fiber is formed from polysulfone, polyimide, polyamide, polyolefine, or polyether imide.

6. The process of claim 1 wherein a counter ion of said polyimide amic acid salt is a tertiary amine.

7. The process of claim 1 wherein said polyimide amic acid salt polymer has a degree of imidization between 30 and 80 percent.

8. The process of claim 1 wherein said thermal imidization is carried out at a temperature between 100 and 200 degrees centigrade.

9. The process of claim 1 wherein said polyimide membrane is an asymmetric membrane formed by following general process: a) forming a membrane casting solution comprised of the polyimide amic acid salt polymer in at least one polar solvent; b) shaping said casting solution into a membrane configuration; c) conveying said membrane configuration through an evaporation zone; d) contacting said membrane configuration with a coagulation fluid to form a solidified polyimide amic acid salt membrane; e) washing said solidified membrane to remove residual solvent; f) drying said membrane in step e to form a dried membrane; g) converting said dried membrane into said asymmetric polyimide membrane by thermal or chemical treatment.

10. The process of claim 9 wherein said thermal treatment is carried out at a temperature between 100 and 300 degrees centigrade.

11. The process of claim 9 wherein said chemical treatment is carried out by contacting said dried membrane with a solution of a dehydration agent.

12. A process of claim 1 wherein said gas mixture is air.

13. A process of claim 1 wherein said gas mixture contains carbon dioxide or hydrogen.

14. A polyimide fluid separation membrane formed by thermal or chemical imidization of a polyimide amic acid salt precursor of the following general formula:

where X is a protonated tertiary amine, a quaternary amine, a phosphonium ion, a sulfonium ion, or a mixture thereof and m and n are fractions from 0.025 to 0.95, and Ar and Ar' are each either aliphatic or aromatic radicals.

15. The fluid separation membrane of claim 14 wherein said polyimide is formed from polyimide amic acid salt random copolymer of the following general formula:

where X is a protonated tertiary amine, a quaternary amine, a phosphonium ion, a sulfonium ion, or a mixture thereof and m and n are fractions from 0.025 to 0.95, where is independently

-continued or mixtures thereof;

—R'— is

—R"— is

Z and Z' are:
—H, —CH$_3$, —CH$_2$CH$_3$, —CH$_2$CH$_2$CH$_3$, iso-propyl, iso-butyl, tert-butyl, —Br, —Cl, —F, —NO$_2$, —CN —Ar'— is independently or mixtures thereof, and where Ar is defined as above; and —Ar$_1$— is -continued 16. The fluid separation membrane of claim 14 wherein x is a protonated tertiary amine.

17. The fluid separation membrane of claim 14 wherein said polyimide amic acid salt precursor has a degree of imidization in the range of 5 to 95 percent.

18. The fluid separation membrane of claim 17 wherein said polyimide amic acid salt precursor has a degree of imidization in the range of 30 to 80 percent.

19. A polyimide amic acid salt polymer having the following general formula:

where X is a protonated tertiary amine, a quaternary amine, a phosphonium ion, a sulfonium ion, or a mixture thereof and m and n are fractions from 0.025 to 0.95, and Ar and Ar' are aliphatic or aromatic radicals.

20. The polyimide amic acid salt polymer of claim 19 wherein said polyimide amic acid salt polymer is an aromatic polymer of the following general formula:

where X is a protonated tertiary amine, a quaternary amine, a phosphonium ion, a sulfonium ion, or a mixture thereof and m and n are fractions from 0.025 to 0.95;

wherein is independently

-continued or mixtures thereof;

—R'— is

-continued

—R″— is

Z and Z' are:
—H, —CH₃, —CH₂CH₃, —CH₂CH₂CH₃, iso-propyl, iso-butyl, tert-butyl, —Br, —Cl, —F, —NO₂, —CN where —Ar'— is independently

-continued or mixtures thereof; where Ar is defined as above
—Ar₁— is where n is from 1 to 4.

21. The polyimide amic acid salt polymer of claim 20 wherein the X is a protonated tertiary amine.

22. The polyimide amic acid salt polymer of claim 20 wherein said polyimide amic acid salt has a degree of imidization of from 5 to 95 percent.

23. The polyimide amic acid salt polymer of claim 22 wherein the degree of imidization is from 30 to 80 percent.

24. A polyimide formed by thermal or chemical imidization of polyimide amic acid salt precursor of the following general formula:

where X is a protonated tertiary amine, a quaternary amine, a phosphonium ion, a sulfonium ion, or a mixture thereof and m and n are fractions from 0.025 to 0.95, and Ar and Ar' are aliphatic or aromatic radicals.

* * * * *